(12) United States Patent
Yamamura et al.

(10) Patent No.: US 8,177,008 B2
(45) Date of Patent: May 15, 2012

(54) ALL-TERRAIN VEHICLE WITH IMPROVED POWER STEERING UNIT

(75) Inventors: Takashi Yamamura, Shizuoka (JP); Tomoya Ozasa, Shizuoka (JP); Jose Aponte, Newnan, GA (US); Steven Cover, Newnan, GA (US)

(73) Assignees: Yamaha Motor Manufacturing Corporation of America, Newnan, GA (US); Yamaha Hatsudoki Kabushiki Kaisha, Shizuoka (JP)

( * ) Notice: Subject to any disclaimer, the term of this patent is extended or adjusted under 35 U.S.C. 154(b) by 516 days.

(21) Appl. No.: 12/365,346

(22) Filed: Feb. 4, 2009

(65) Prior Publication Data

US 2010/0194086 A1 Aug. 5, 2010

(51) Int. Cl.
*B60R 16/04* (2006.01)
(52) U.S. Cl. ........................ 180/68.5; 180/443
(58) Field of Classification Search ............ 180/68.5, 180/69.2, 68.4, 291, 89.1, 89.11, 443; 296/203.01, 296/193.08, 205, 203.02
See application file for complete search history.

(56) References Cited

U.S. PATENT DOCUMENTS

| | | | | |
|---|---|---|---|---|
| 5,887,671 A * | 3/1999 | Yuki et al. | | 180/68.1 |
| 6,068,675 A * | 5/2000 | Tsuda et al. | | 55/385.3 |
| 7,216,733 B2 * | 5/2007 | Iwami et al. | | 180/68.1 |
| 7,950,486 B2 * | 5/2011 | Van Bronkhorst et al. | | 180/89.11 |
| 2006/0191734 A1 | 8/2006 | Kobayashi | | |

* cited by examiner

*Primary Examiner* — John Walters
(74) *Attorney, Agent, or Firm* — Keating & Bennett, LLP

(57) ABSTRACT

A vehicle is provided with a front hood 33 that covers, from above, the front of the front panel 5, a battery 49 provided below the front hood 33, where at least the top of the battery is positioned above the top 3*a* of the front wheels 3 when in a stationary state, an electric power steering unit 40 that is provided under the front hood 33, having an electric motor 40*a* disposed so that at least a portion thereof overlaps at least a portion of the battery 49 vertically, and an electric power steering control device 50 that is connected to the battery 49 and the electric motor 40*a*.

16 Claims, 18 Drawing Sheets

ALL-TERRAIN VEHICLE WITH IMPROVED POWER STEERING UNIT

BACKGROUND OF THE INVENTION

1. Field of the Invention

The present invention relates to an all-terrain vehicle wherein a cabin outer frame and a front frame is structured from a vehicle body frame. An improved power steering unit in combination with the positioning of a complimentary battery unit within a space defined by the front frame is provided.

2. Description of Related Art

In all-terrain vehicles, there is a need to increase the vertical stroke or travel of the wheel when traveling over uneven terrain. A prior art vehicle that responds to this need is disclosed in U.S. Patent Application Publication No. 2006/0191734. In the prior art, the engine is mounted behind the steering along the length of the vehicle, thereby allowing a long vertical wheel stroke to be maintained.

Also in all-terrain vehicles, mounting the electric power steering unit on the steering shaft has been studied, and electric power steering units have been so mounted in the vehicles described in the above publication. In these prior art vehicles, the design of the electric motor attachment structure for the electric power steering unit reduces the vehicle width; however, when such a design is utilized, there is a possibility that the mounting structure will restrict the vertical stroke of the wheels.

SUMMARY OF THE INVENTION

The present invention was developed in view of the prior art, and an object of the invention is to provide an all-terrain vehicle with an electric power steering unit mounted in a manner for maintaining a compact vehicle width while providing a long vertical wheel stroke.

In accordance with the all-terrain vehicle of the present invention, the battery is disposed above the upper end of the front wheels when in a stationary state, and the electric motor of the electric power steering unit is disposed so that it essentially overlaps with the battery in the vertical direction. The electric motor and battery thus do not impede ensuring a long vertical front wheel stroke, and it is not necessary to placed the front wheels outwards in the direction of vehicle width in order to ensure the vertical stroke of the front wheels. As a result, the electric power steering unit can be mounted while ensuring a compact vehicle width and a long vertical wheel stroke.

DETAILED DESCRIPTION

Figure 1:
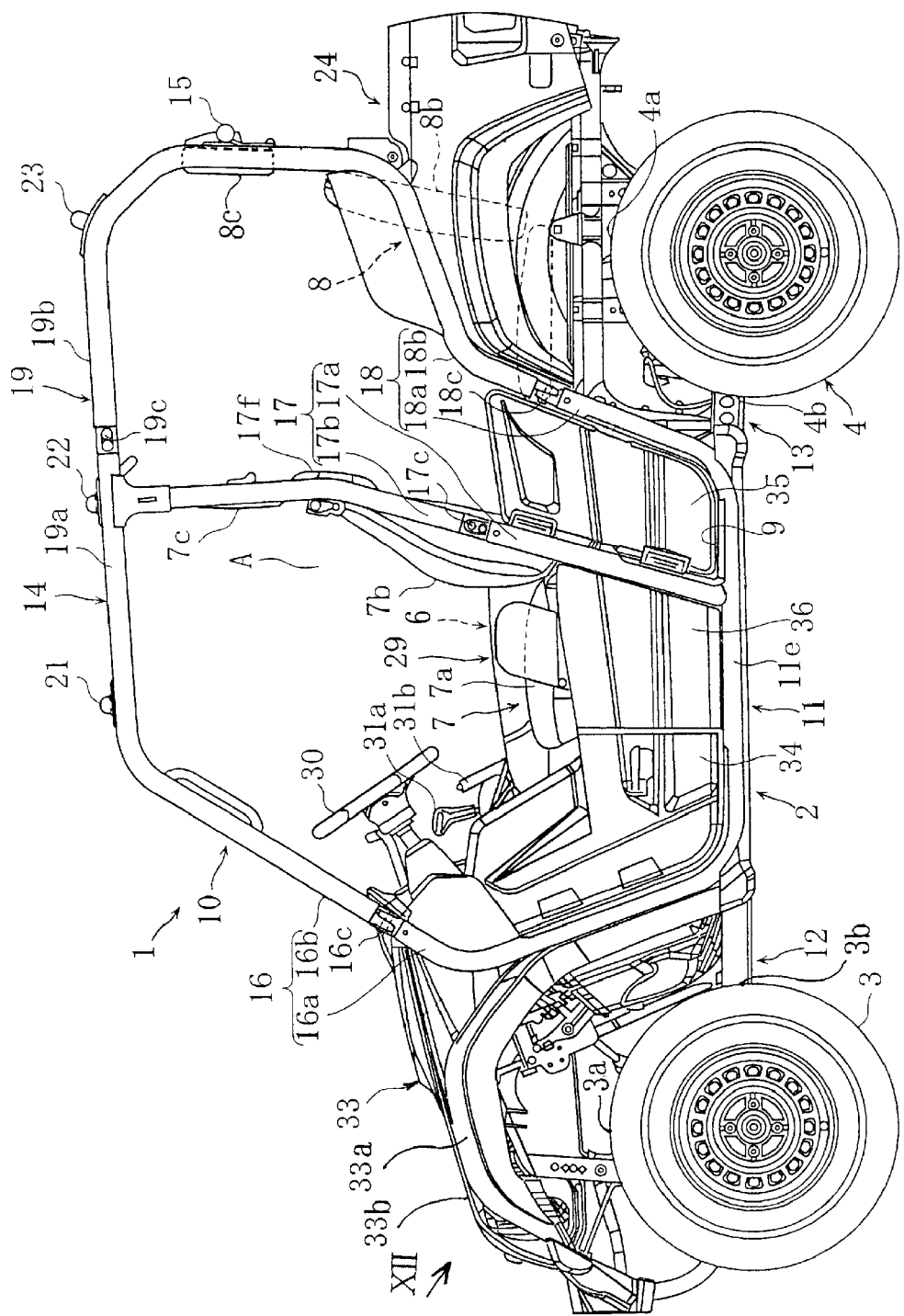
FIG. 1 is a left side view of the all-terrain vehicle pertaining to a first embodiment of the present invention.
Figure 2:
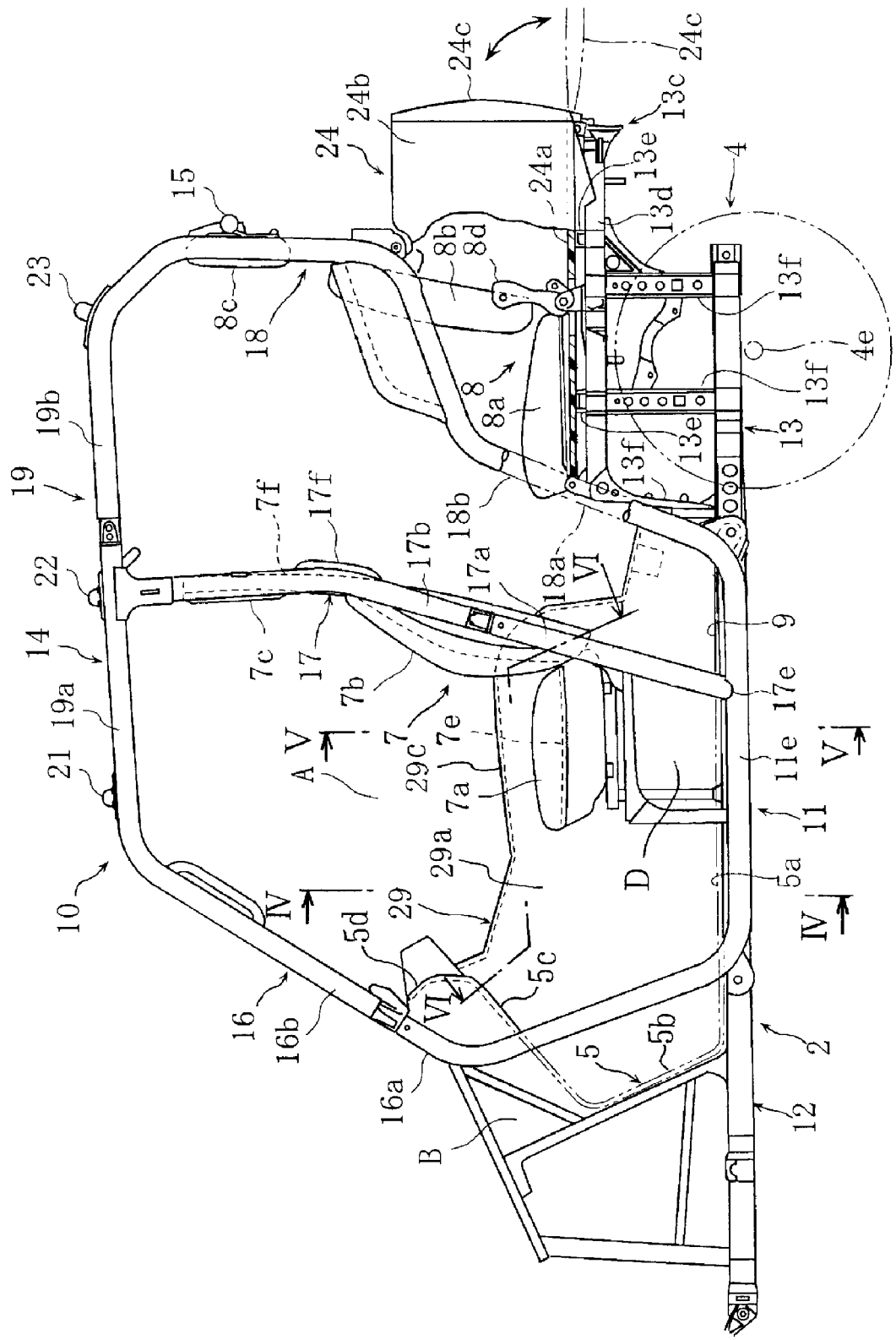
FIG. 2 is a left side view showing the vehicle body frame, roof supports, roof members, and seats.

Embodiments of the present invention are described below in reference to the attached drawings.

FIGS. 1 to 18 are drawings for describing an all-terrain vehicle according to an embodiment of the present invention. In the present specification, unless otherwise specified, front, forward, back, rear, ahead, behind, left, right, above, and below, and similar directions, are from the perspective of a passenger sitting on a seat. Also, as shown in the Figures like parts are identified with the same numeral. The front wheels are the same on both the left and right sides, so they are referenced by like numeral 3. In some instances only the left side of the vehicle is shown, but it is understood that similar items on the right side, while not shown, are of similar nature.

As shown in the Figures, all-terrain vehicle 1 is provided with a vehicle body frame 2; a pair of left and right front wheels 3 that are supported on the left and right side portions at the forward portion of the vehicle body frame 2; a pair of left and right rear wheels 4 that are supported on the left and right side portions of the rear portion; a front panel 5 that is disposed to the rear of the front wheels 3 of the vehicle body frame 2, in the front/rear direction of the vehicle; and an engine unit 6 that is disposed to the rear, in the front/rear direction of the vehicle, of the front panel 5 of the vehicle body frame 2.

Additionally, the all-terrain vehicle 1 is provided with a front seat 7 that is disposed to the rear, in the front/rear direction of the vehicle, of the front panel 5 of the vehicle body frame 2; a rear seat 8 that is disposed to the rear, in the front/rear direction of the vehicle, of the front seat 7; a rear floor 9 that is disposed at a position that is lower than the top end 4a of the back wheel 4, between, in the front/rear direction of the vehicle, the front seat 7 and the rear seat 8; a cargo bed 24 that is provided to the rear, in the front/rear direction of the vehicle, of the front seat 7; and a cabin structuring member 10, attached to the vehicle body frame 2, structured from left and right side portions and a ceiling portion of the cabin A.

The engine unit 6 has a structure that can be summarized as a cylinder body 6b, a cylinder head 6c and a head cover 6d joined to the rear portion of the top surface of the crank case 6a, oriented so as to angle upwards towards the rear of the vehicle. In addition, a transmission case 6j that houses a V-belt continuously variable transmission is provided in the left side portion of the crank case 6a.

In addition, a throttle body 6e is connected to the front wall, in the front/rear direction of the vehicle, of the cylinder head 6c. An inlet pipe 6f is connected to this throttle body 6e. The inlet pipe 6f is formed in front of the front panel 5, and extends into the front frame space B that is opened and closed by the front hood 33. A surge tank 6g is interposed in the middle of the inlet pipe 6f, with an air cleaner 42 connected at the upstream end. An exhaust pipe 6i is connected to the rear wall of the cylinder head 6c.

Figure 3:
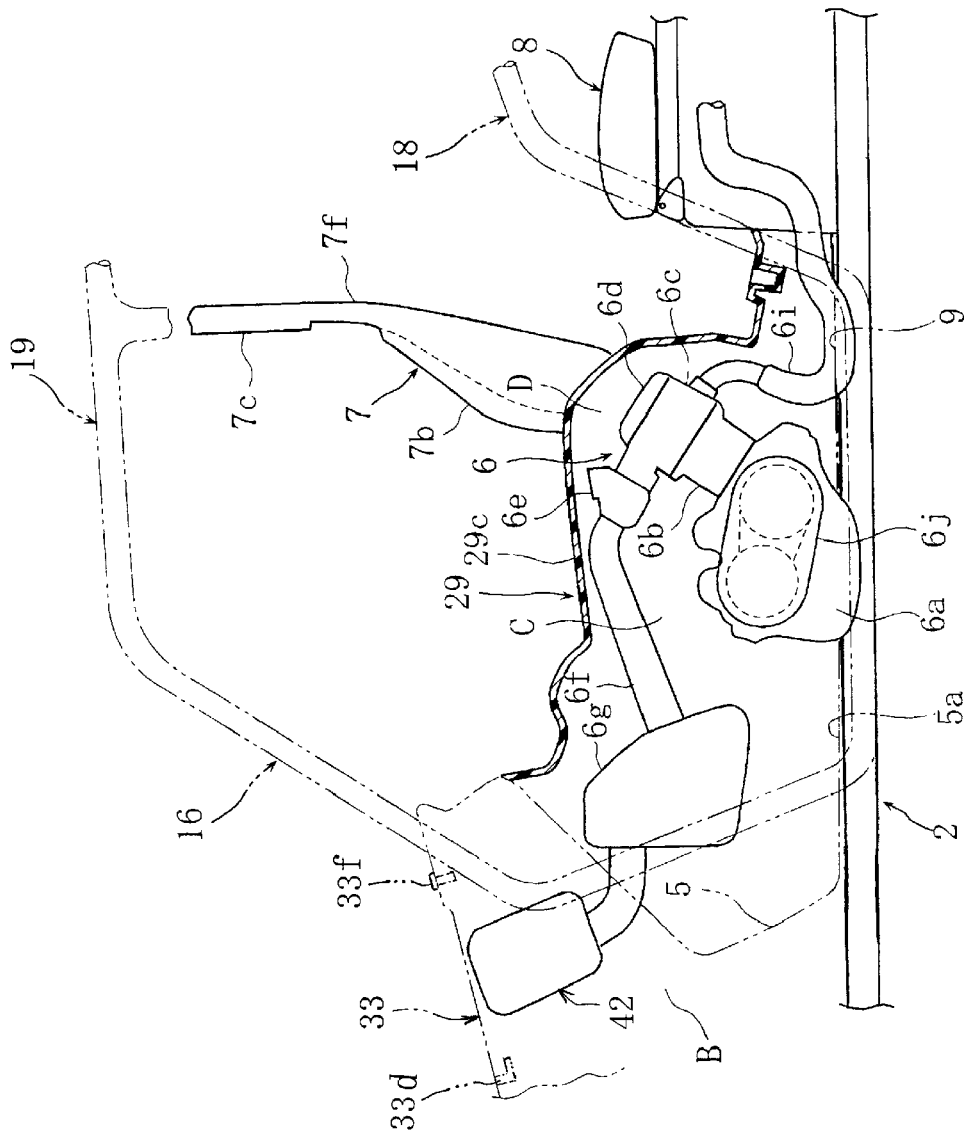
FIG. 3 is a sectional left side view showing the relationship between the center console and the engine unit.

The engine unit 6 is disposed in an interior space C of the center console 29. The center console 29 comprises a left side wall 29a, a right side wall 29b, and a top wall 29c, and extends in the rearward direction from the center portion, in the direction of vehicle width, of the front panel 5 to the rear of the rear end portion of a seat cushion portion 7a of the front seat 7. Furthermore, as illustrated in FIG. 3 and FIG. 4, the top portion above the transmission case 6j of the engine unit 6 is covered from above and from the left and right sides by a top wall 29c and by left and right side walls 29a and 29b of the center console 29.

Figure 4:
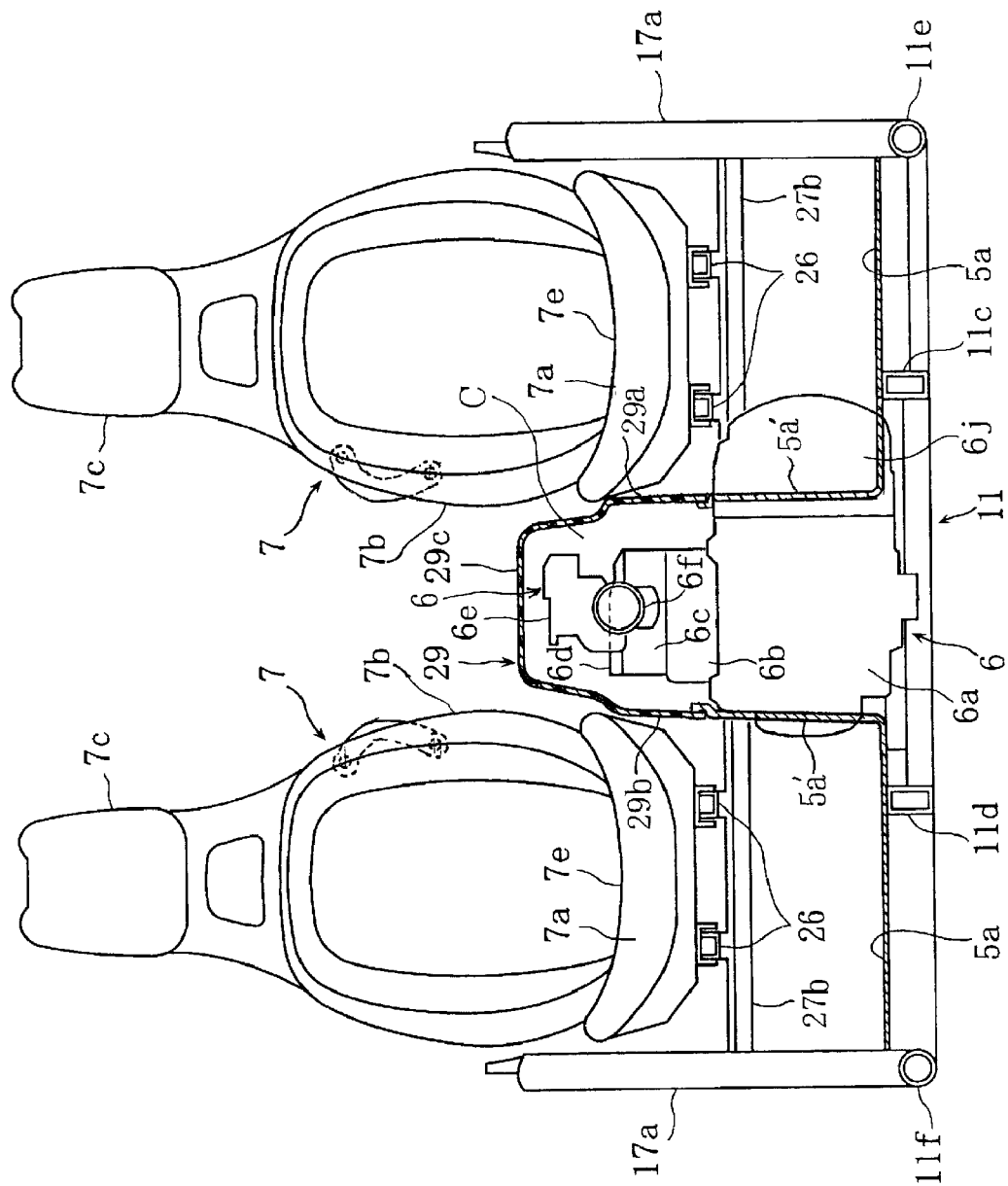
FIG. 4 is a cross-sectional view along the section IV-IV of FIG. 2 showing the relationship between the seats, center console, and engine.
Figure 5:
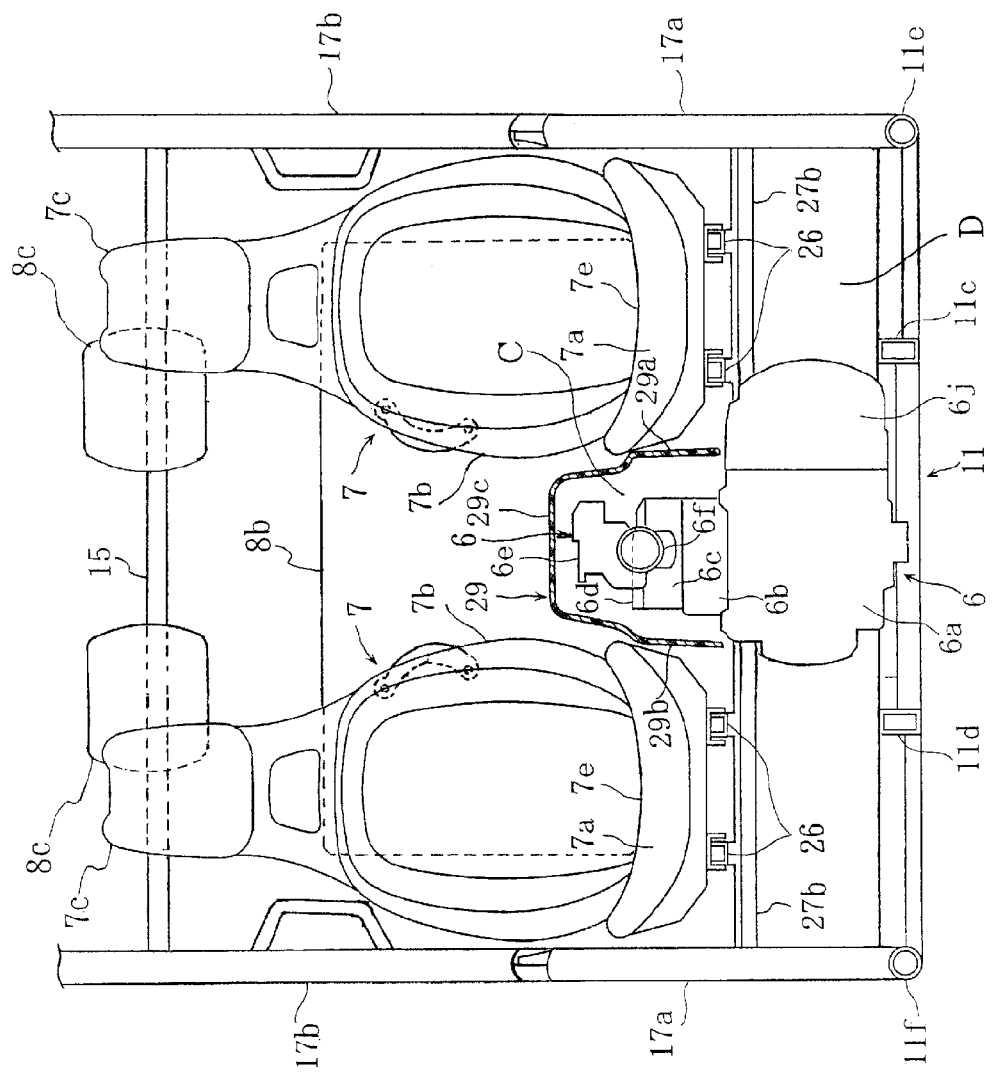
FIG. 5 is a cross-sectional view along the section V-V of FIG. 2 showing the relationship between the seats, center console, and engine.
Figure 6:
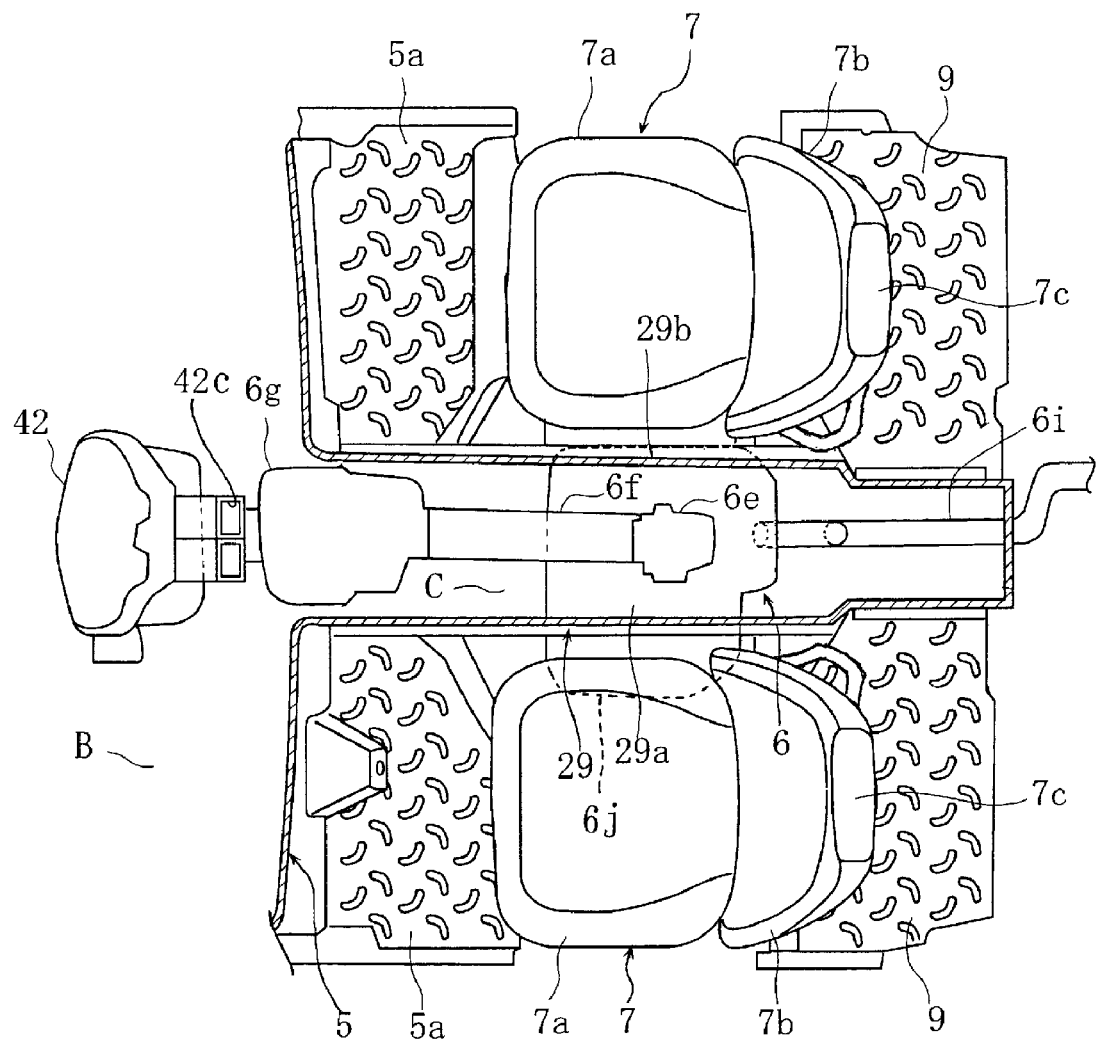
FIG. 6 is a cross-sectional view along the section VI-VI of FIG. 2 showing the relationship between the seats, center console, and engine.
Figure 7:
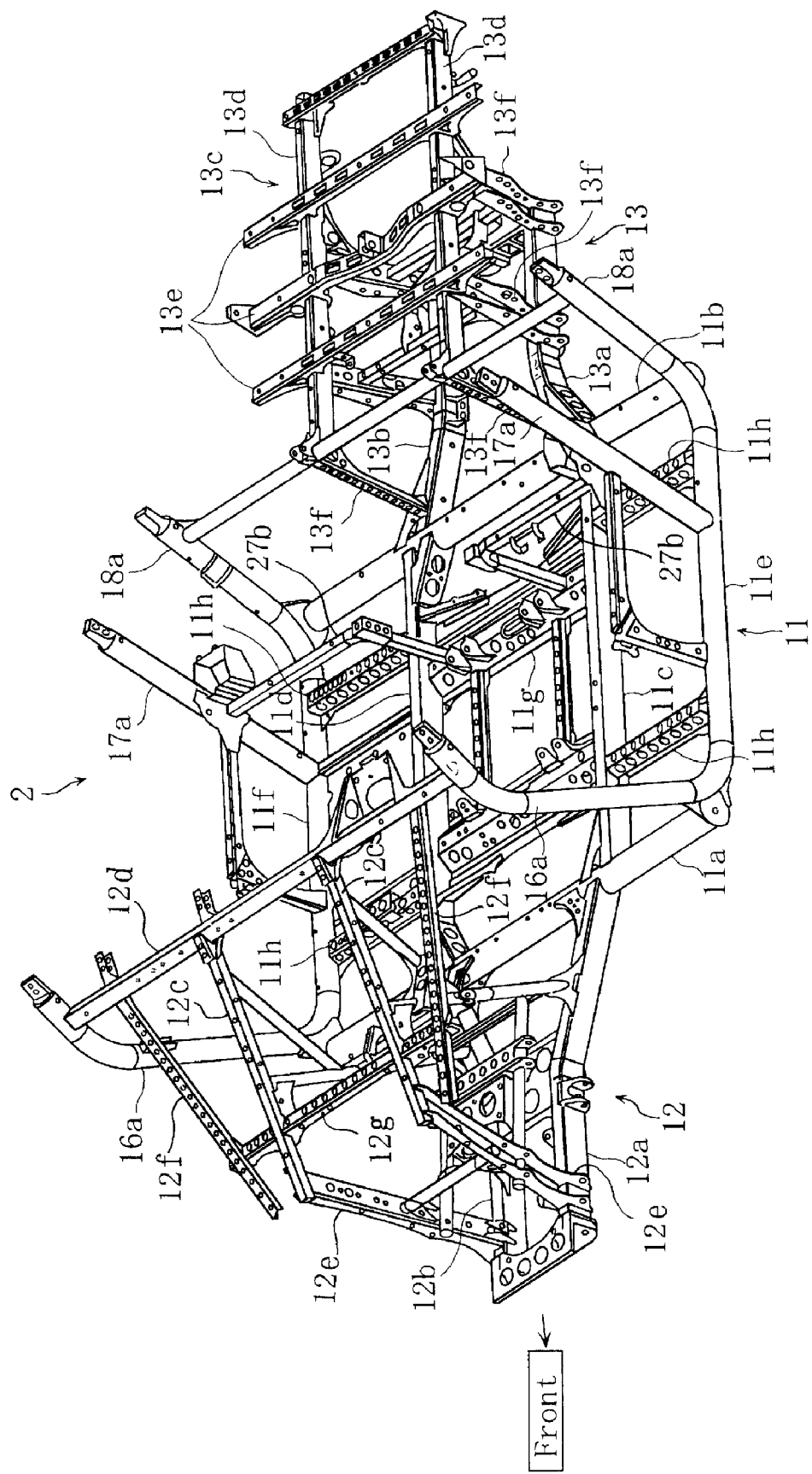
FIG. 7 is an oblique view showing the lower part of the vehicle body frame and roof support.
Figure 8:
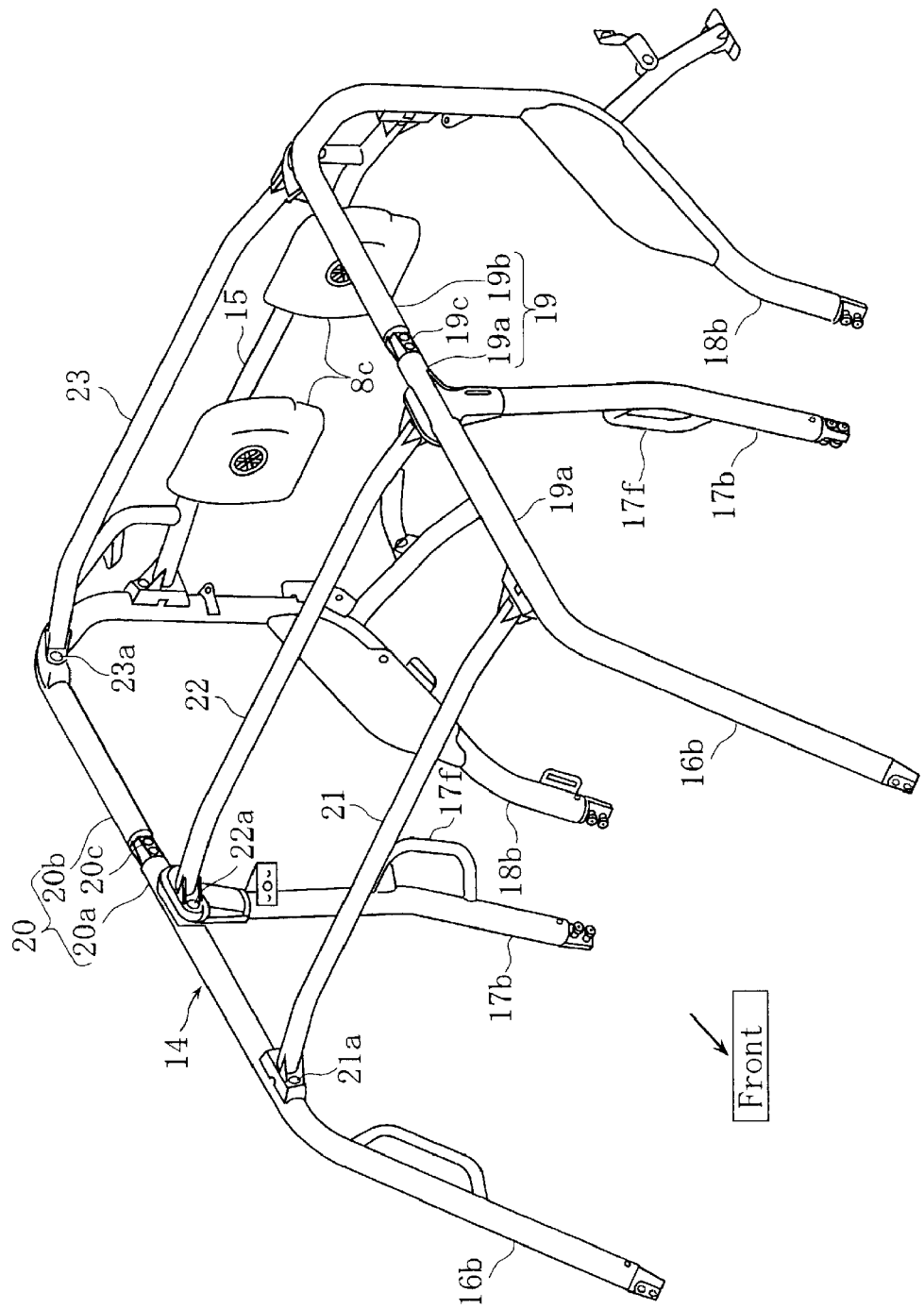
FIG. 8 is an oblique view showing the upper part of the roof support and the roof members.
Figure 9:
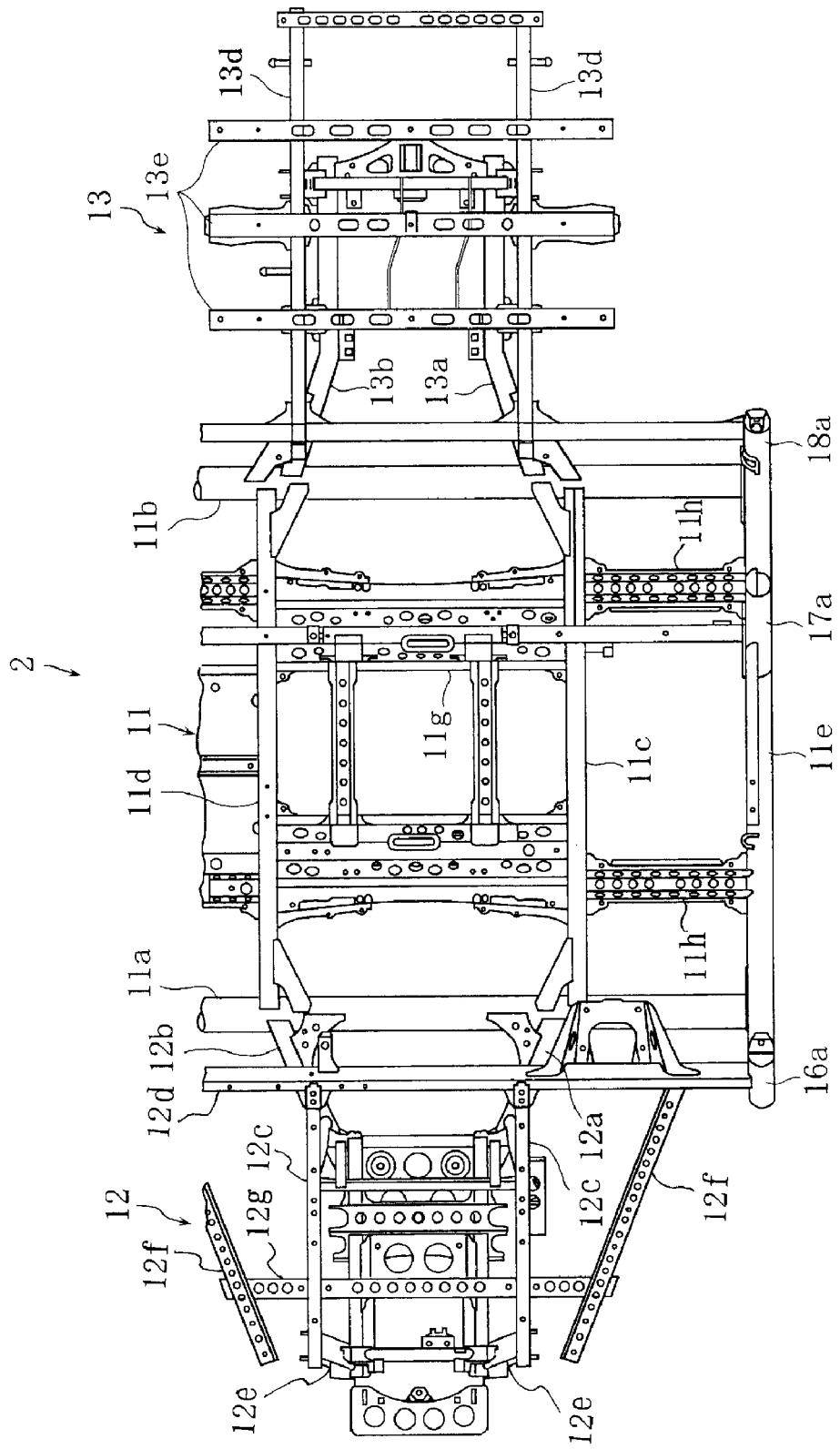
FIG. 9 is a plan view of the vehicle body frame and the lower part of the roof supports.
Figure 10:
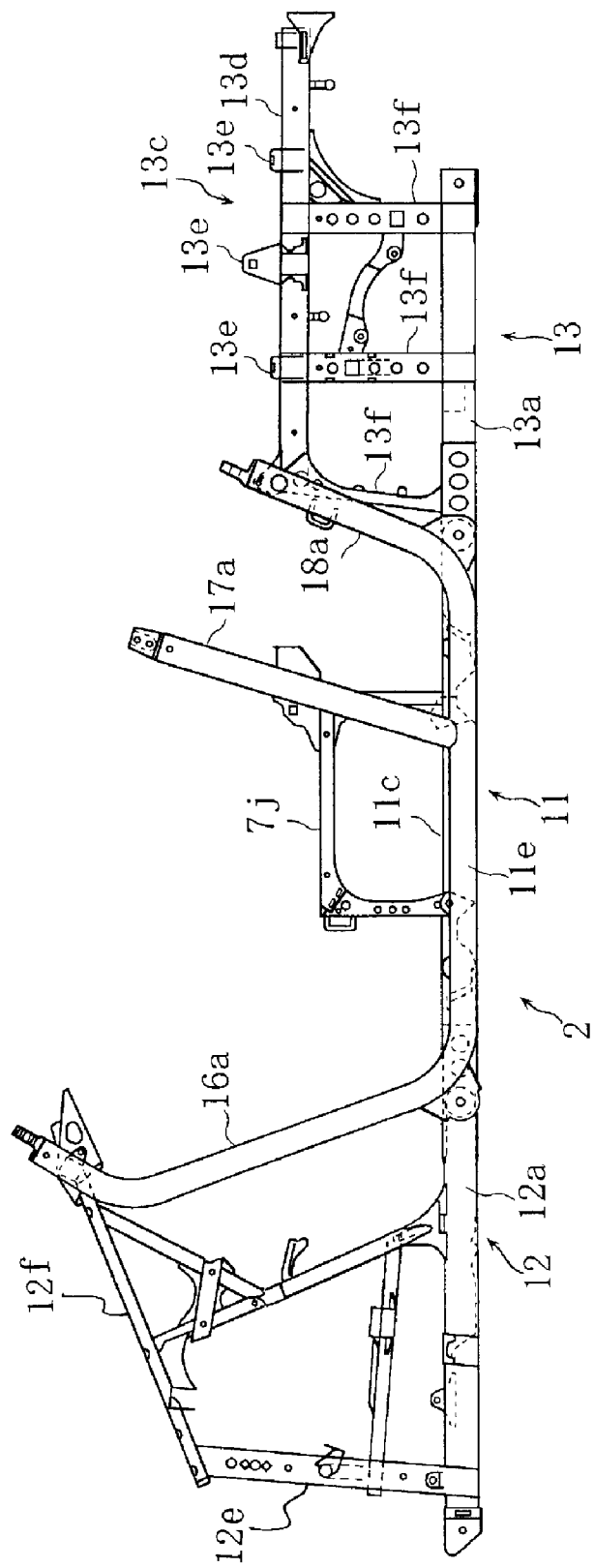
FIG. 10 is a left side view of the vehicle body frame and the lower part of the roof supports.
Figure 11:
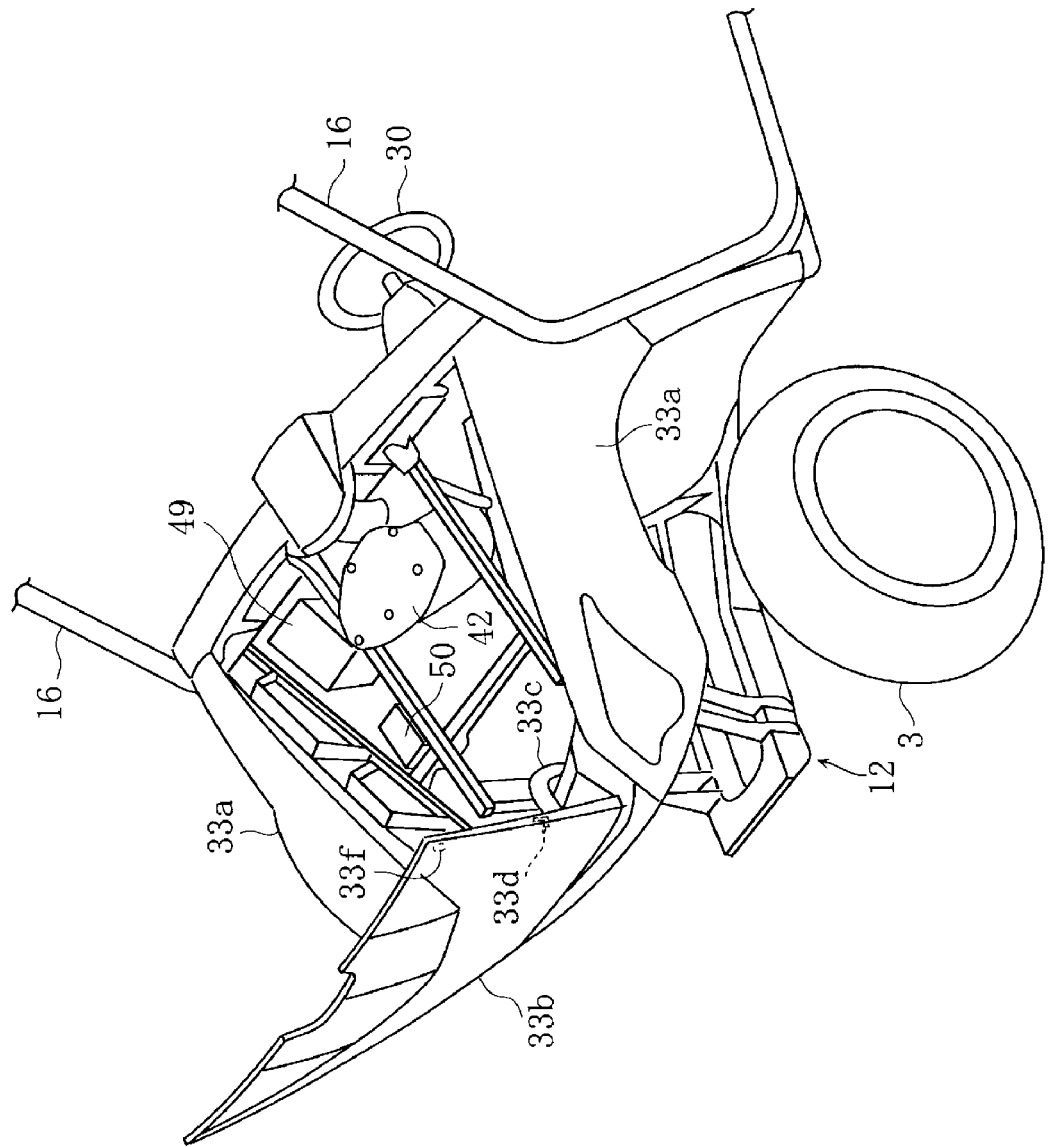
FIG. 11 is an oblique view showing the front hood lid in an open state.
Figure 12:
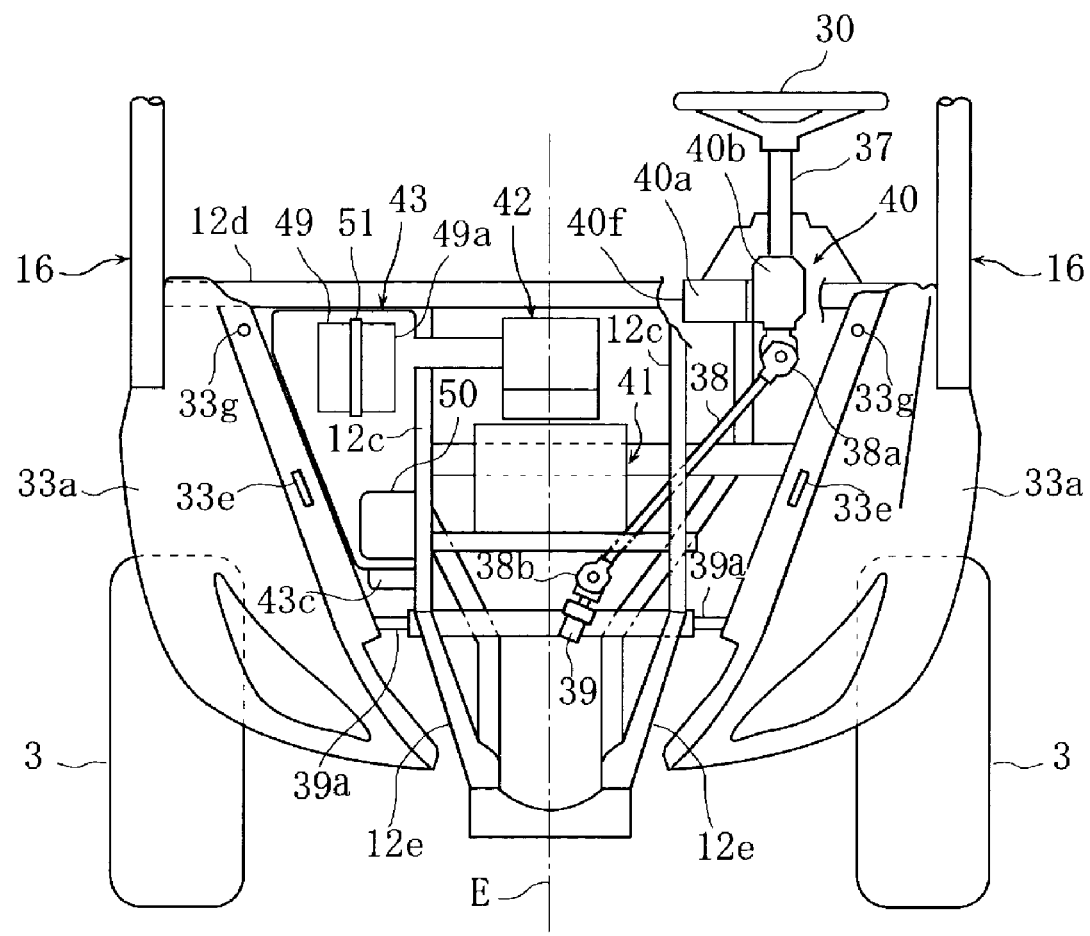
FIG. 12 is an oblique view from above and at an angle showing the layout of the battery, the electric power steering unit, and the radiator (viewed as indicated by the arrow XII in FIG. 1).
Figure 13:
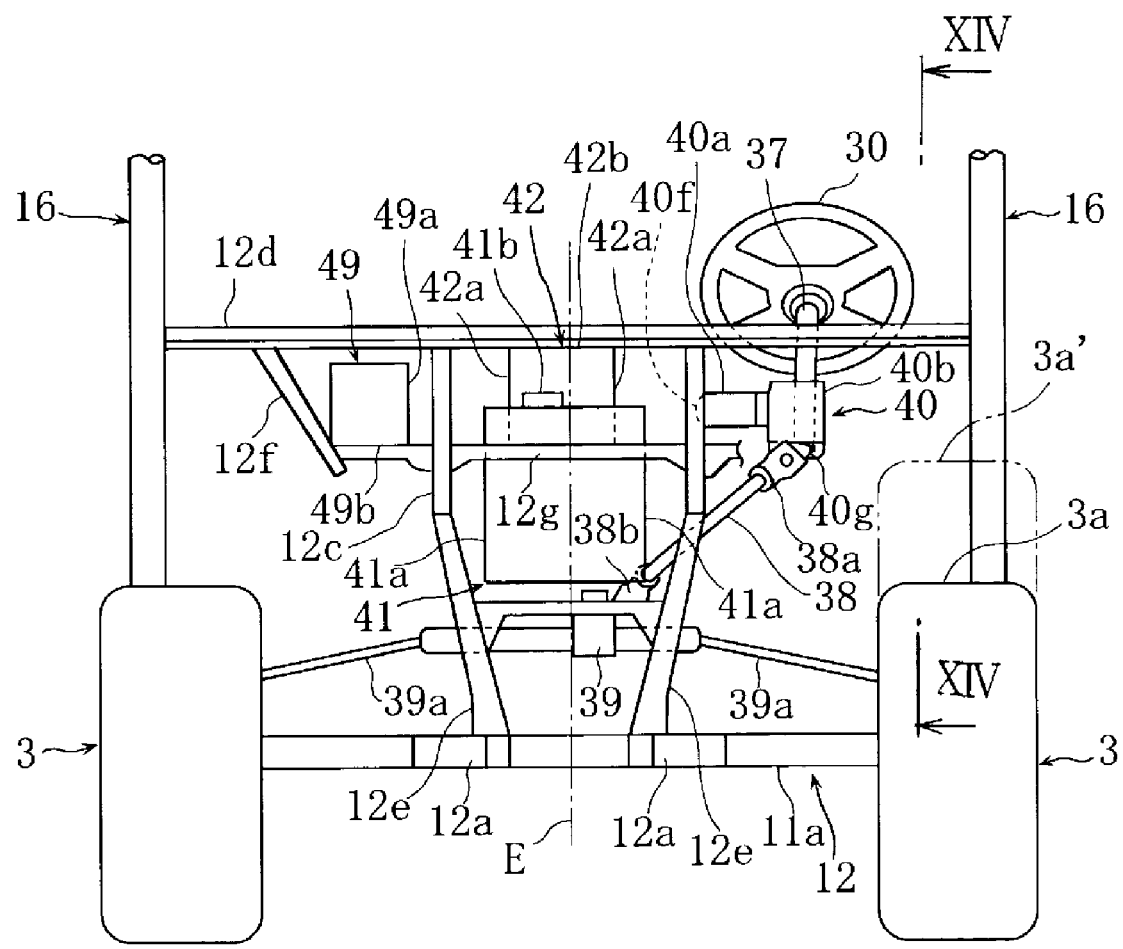
FIG. 13 is an elevation view showing the layout of the battery, the electric power steering unit, and the radiator.
Figure 14:
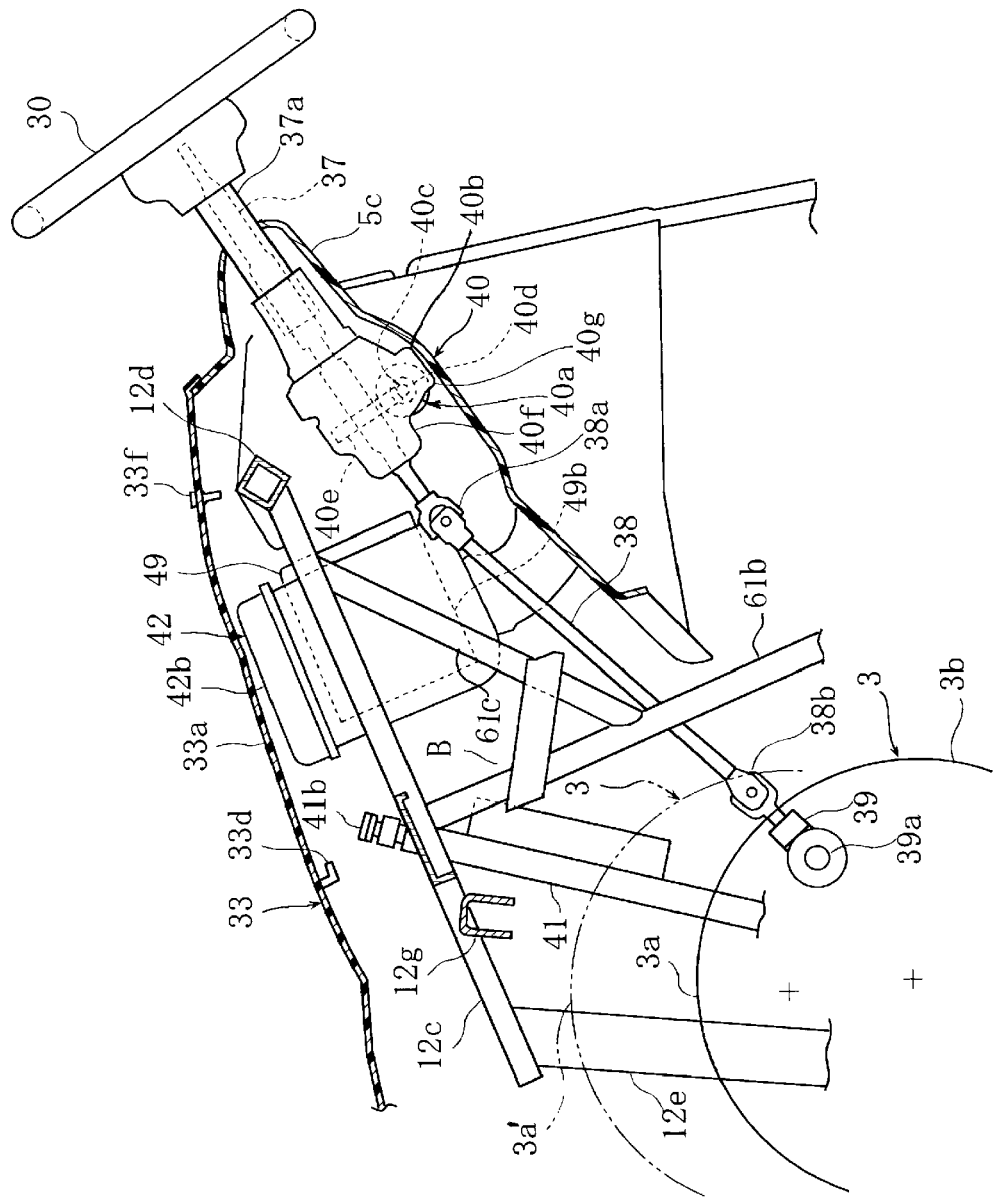
FIG. 14 is a cross-sectional view along the section XIV-XIV of FIG. 13 showing the layout of the battery, the air cleaner, and the electric power steering unit.
Figure 15:
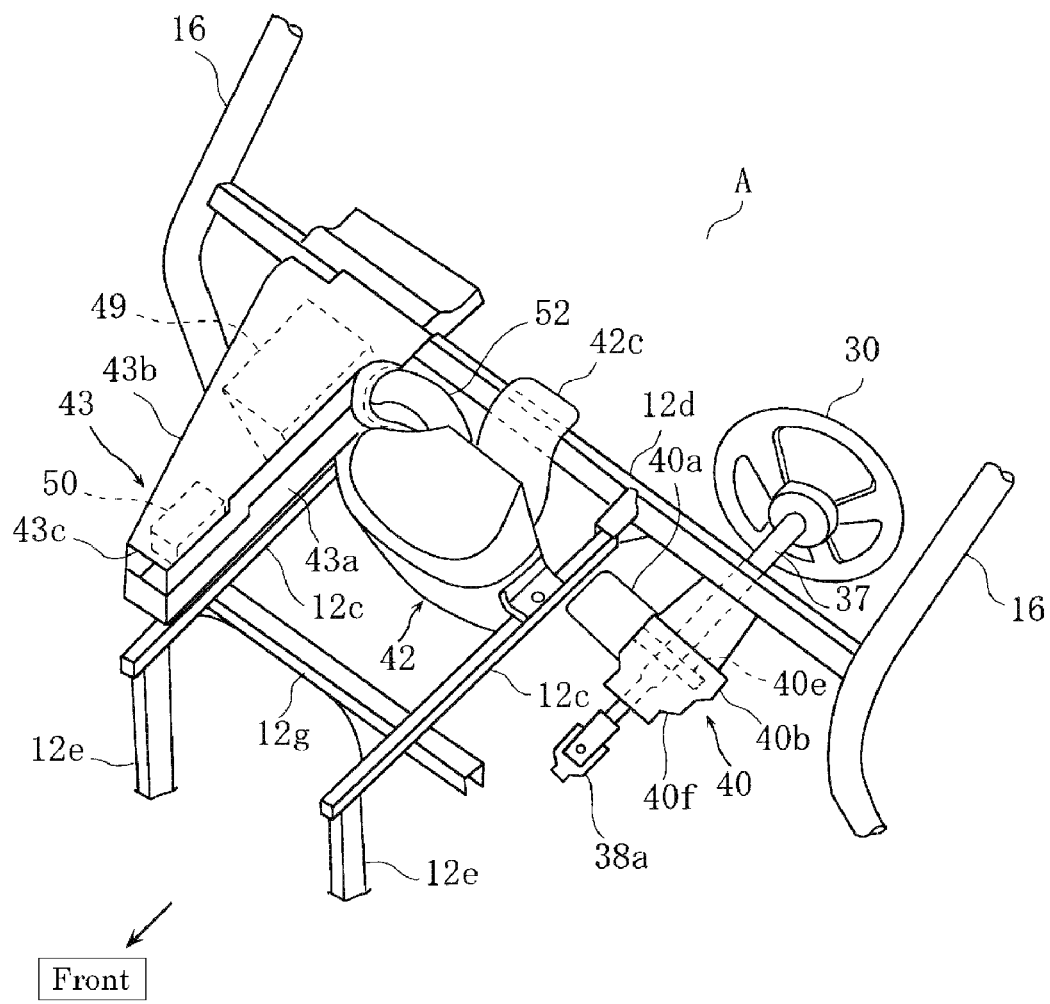
FIG. 15 is an oblique view showing the layout of the housing box, the air cleaner, and the electric power steering unit.
Figure 16:
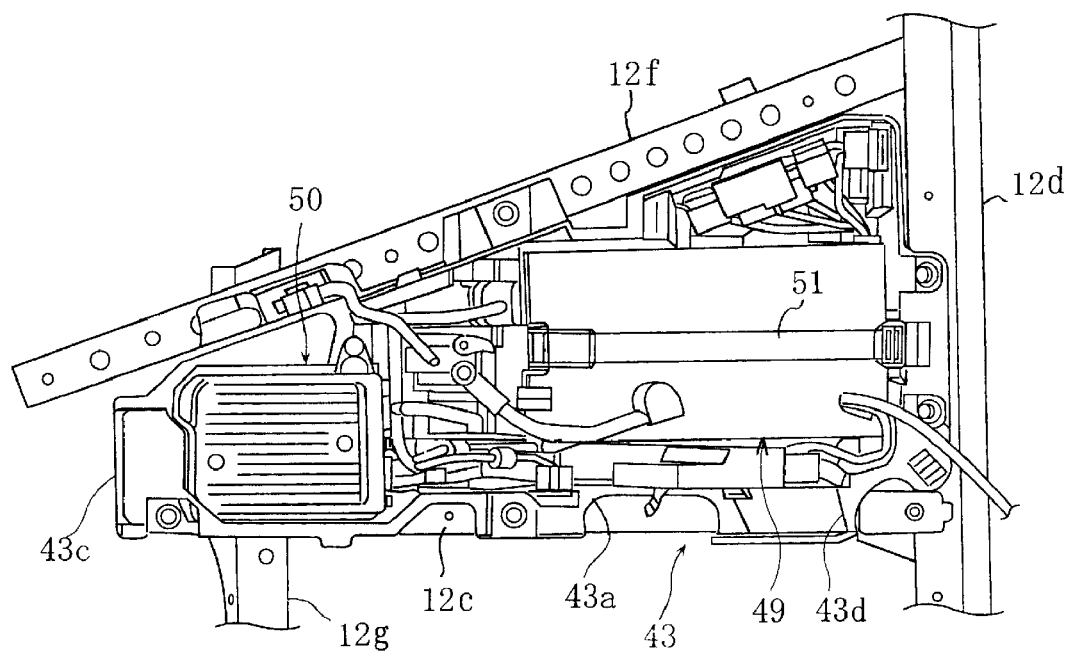
FIG. 16 is a plan view showing the layout of the battery and the control unit.
Figure 17:
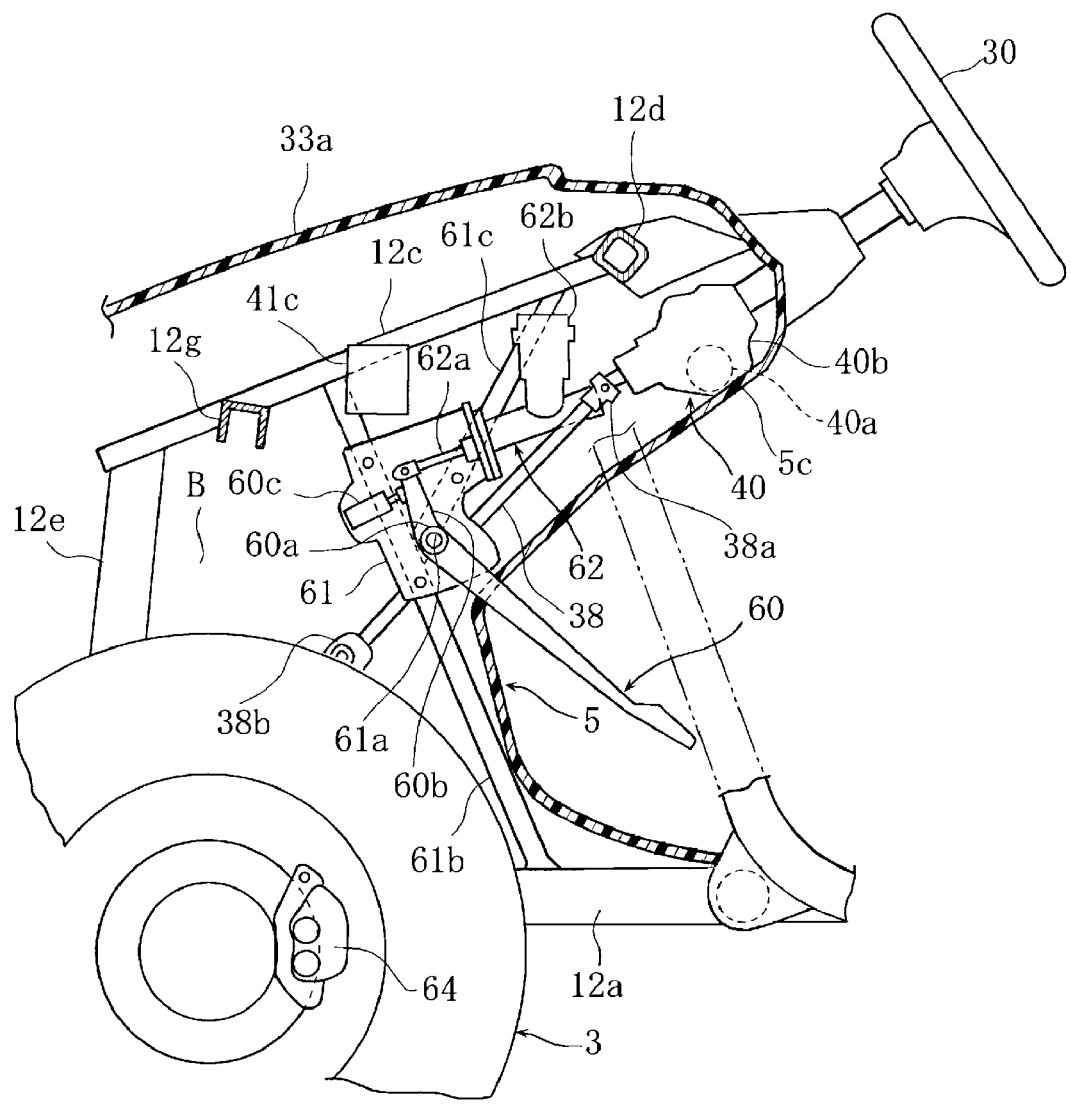
FIG. 17 is a left side cross-sectional view showing the layout of the brake pedal, the master cylinder, and the electric power steering unit.
Figure 18:
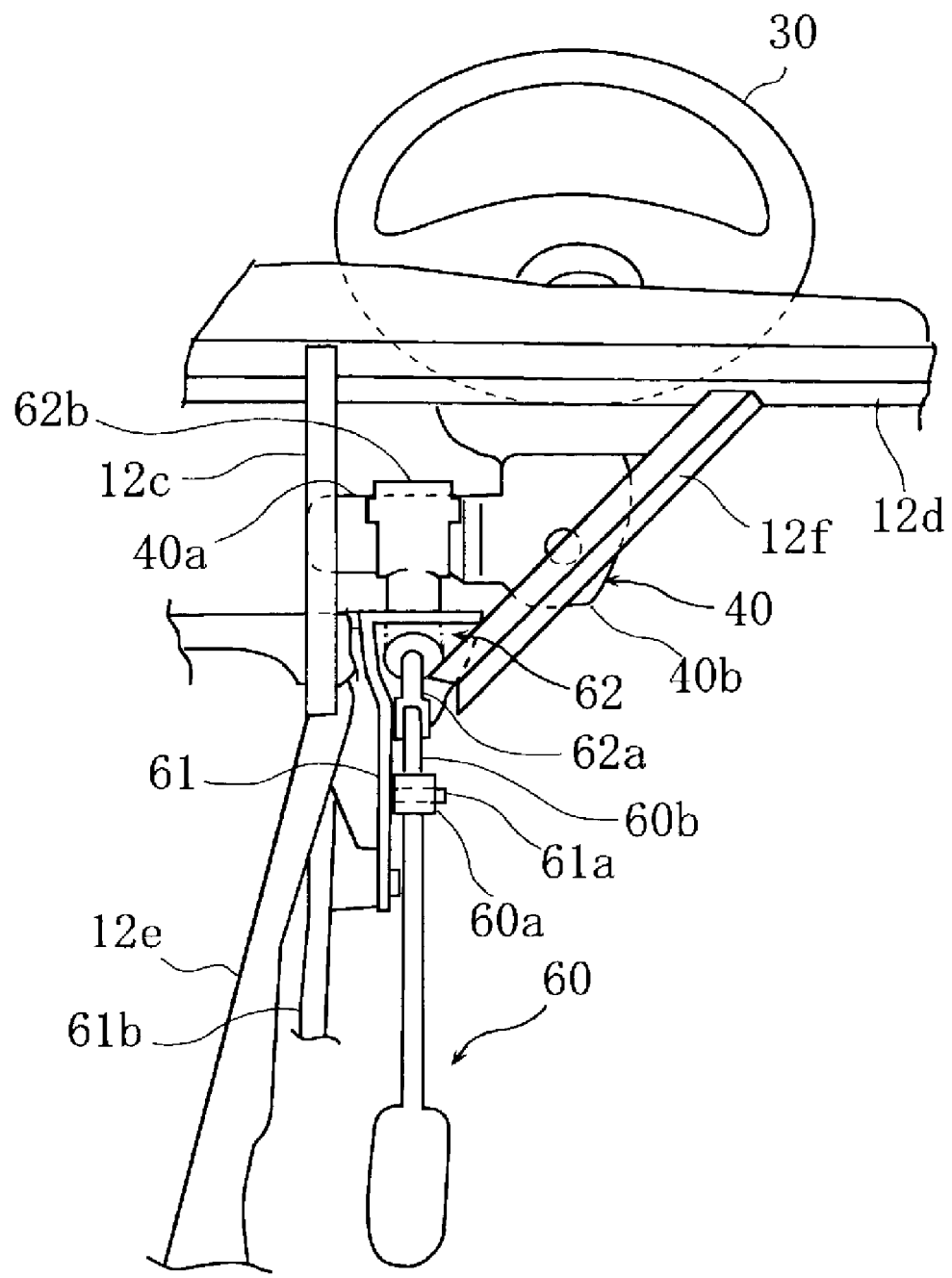
FIG. 18 is an elevation view along showing the layout of the brake pedal, the master cylinder, and the electric power steering unit.

As shown in FIG. 4, the portions of the left and right side walls 29a and 29b of the center console 29 that are further forward from the front seat 7 are connected to an upwardly-extending portion 5a' of the front floor 5a.

Furthermore, the top wall 29c of the center console 29 is positioned at a position that is higher than the seating surface 7e of the center portion, in the direction of vehicle width, of the seat cushion portion 7a of the front seat 7 and in a position that is lower than the upper end 5d of the front panel 5. In addition, the interior space C of the center console 29 communicates with the front frame space B that is covered by the hood 33, so as to be able to open and close, in front of the front panel 5. Furthermore, the interior space C of the center console 29 communicates with the space D below the left and right front seats 7.

The throttle body 6e that is connected to the engine unit 6, the inlet pipe 6f, and the surge tank 6g is disposed within this interior space C, and the air cleaner 42 is disposed within front frame space B.

Note that 30 denotes a steering wheel, 31a denotes a transmission high/low switch lever, and 31b denotes a parking brake lever.

The vehicle body frame 2 has a center frame 11 that constitutes the bottom portion of the cabin A, a front frame 12 that constitutes the front portion of the all-terrain vehicle 1 and is connected to the front end of the center frame 11, and a rear frame 13 that constitutes the rear portion of the all-terrain vehicle 1 and is connected to the rear end of the center frame 11.

The center frame 11 is essentially rectangular in the plan view, and comprises: front and rear cross pipes 11a and 11b that are made from round pipes that extend in the direction of vehicle width; left and right center main pipes 11c and 11d, made from square pipes, connecting the front and rear cross pipes 11a and 11b at the center portion in the direction of vehicle width; and left and right side pipes 11c and 11f, made from round pipes, connecting at the outside edge portions in the direction of vehicle width.

In addition, an engine bracket 11g, on which the engine unit 6 is mounted, is provided between the left and right center main pipes 11c and 11d. Furthermore, a floor bracket 11h, which supports a front floor 5a that extends rearward from the front panel 5, is provided between the left and right center main pipes 11c and 11d and the left and right side pipes 11e and 11f.

The front frame 12 has left and right front main pipes 12a and 12b that extend forward from the part wherein the left and right center main pipes 11c and 11d of the cross pipe 11a connect. These left and right front main pipes 12a and 12b extend angled inward to the front from this connecting portion, and also extend forward in parallel with the center line of the vehicle. The front wheels 3 are supported, via a front arm, on the portion of left and front right main pipes 12a and 12b that extends in parallel, so as to be able to swing up and down.

In addition, the front frame 12 also has upper frames 12c that extend in the front and rear direction above the left and right front main pipes 12a, 12b. The rear end portion of this upper frame 12c is connected to the front cross pipe 12d, and the front end portion is connected to the front main pipes 12a, 12b via a vertical frame 12e. In addition, side frames 12f are disposed outside, in the direction of vehicle width, of the left and right upper frames 12c. The rear end portions of side frames 12f are connected to the front cross pipe 12d, and the front portions of side frames 12f are connected to the cross frame 12g. Side frames 12f in conjunction with left and right front main pipes 12a and 12b, define front frame space B.

The rear frame 13 has left and right rear main pipes 13a and 13b, which extend rearward from the intersections of left and right center main pipes 11c and 11d and the rear cross pipe 11b. A cargo bed frame 13c is disposed above the rear main pipes 13a and 13b.

The left and right rear main pipes 13a and 13b extend angled inward towards the back from the connecting portion, and also extend to the rear in parallel with the center line of the vehicle. The rear wheels 4 are supported, via a rear arm, on the portion that extends rearward, so as to be able to swing up and down.

Additionally, the cargo bed frame 13c is formed through the connection of the rear main pipes 13a and 13b, left and right lengthwise frames 13d that extend in parallel, and a plurality of cross frames 13e that extend in the direction of vehicle width, when viewed from the side of the vehicle. The cargo bed frame 13c is thus secured, so as to be positioned above the rear main pipes 13a and 13b, through a plurality of leg members 13f.

Additionally, a cargo bed 24 made from resin is mounted on the cargo bed frame 13c. This cargo bed 24 is open in the forward and upward directions and consists of a bottom wall portion 24a that is mounted on top of the cargo bed frame 13c, left and right side wall portions 24b that are formed integrally and rise upwards from the left and right edge portions of the bottom wall portion 24a, and a door 24c that constitutes the rear wall.

The front seat 7 is a so-called bucket-type seat wherein the left and the right are separated, and the seat cushion and backrest are structured as a single unit. The left and right front seats 7 each have their respective seat cushion portions 7a, backrest portions 7b that rise up in the upward direction from the back end portions of the seat cushion portions 7a, and headrest portions 7c that are formed integrally at the upper end portion of the backrest portions 7b. The seat cushion portion 7a is supported via a seat rail 26 on the seat frame 27b.

The rear seat 8 is a bench-type seat in which the left and right portions are integrally formed. The seat comprises: a left and right integrated seat cushion portion 8a; a left-right integrated backrest portion 8b that is attached via a bracket 8d to the rear end portion of the seat cushion portion 8a, allowing frontward rotation; and headrest portions 8c that are formed independently on the left and right.

The head rest portion 8c separates upwards from the backrest portion 8b. This headrest portion 8c is also attached to a rear cross pipe 15 that will be described below.

The cabin structuring member 10 comprises: front roof supports (first roof supports) 16, provided on the left and right side portions of the center frame 11; center roof supports 17; rear roof supports (second roof supports) 18; along with a roof member 14 that connects the top portions of the front, center, and rear roof supports 16, 17, and 18. The cabin structuring member 10 produces a cabin that feels open.

The present invention can be utilized in cases where a center roof support 17 is not provided, and the second roof support in the present invention denotes the rear roof support 18 in the present embodiment.

The front roof support 16 is provided on the front end portions of the left and right side portions of the center frame 11. Specifically, this support is a round pipe that extends upwards from the front end portions of the left and right side pipes 11e and 11f, connecting therewith. Additionally, the front roof supports 16 are partitioned into lower portions 16a and upper portions 16b, and are connected via bolts 16c that are inserted in the forward/back direction of the vehicle.

The center roof supports 17 are provided in the center portion, in the front/rear direction, at the left and right side portions of the center frame 11, further towards the rear, in the front/rear direction of the vehicle, from the front roof supports 16, and, more specifically, are connected to the middle portions of the left and right side pipes 11e and 11f, and are structured from round pipe members extending upward therefrom. The center roof supports 17 are divided into lower portions 17a and upper portions 17b, and are connected by bolts 17c that are inserted in the direction of vehicle width.

The rear roof supports 18 are disposed at the rear end portions on the left and right side portions of the center frame 11, further towards the rear, in the front/rear direction of the vehicle, from the center roof supports 17, specifically, from round pipes that extend upwards from the rear end portion of the left and right side pipes 11e and 11f and connect therewith. The rear roof supports 18 are divided into lower portions 18a and upper portions 18b, and are connected by bolts 18c that are inserted in the front/rear direction of the vehicle.

The roof member 14 comprises left and right side roof pipes 19 and 20, which extend in the front/rear direction of the vehicle and which connect together the upper end portions of the front, center, and rear roof supports 16, 17, and 18, and further comprises front, center, and rear cross roof pipes 21, 22, and 23, extending in the direction of vehicle width, which connect together the front end portions, connect together the center portions, and connect together the rear end portions of the left and right side roof pipes 19 and 20. The rear roof supports 18 are connected by the rear cross pipe 15. The head rest portions 8c of the rear seat 8 are attached to the rear cross pipe 15.

The left side roof pipe 19 is partitioned into a forward portion 19a and a rear portion 19b, and is connected by bolts 19c that are inserted in the direction of vehicle width. Similarly, the right side roof pipe 20 is partitioned into a forward portion 20a and a rear portion 20b, and is connected by bolts 20c that are inserted in the direction of vehicle width.

The front, center, and rear cross roof pipes 21, 22, and 23 are connected by bolts 21a, 22a, and 23a, which are inserted in the direction of vehicle width with respect to the left and right side roof pipes 19 and 20. Here, front doors 34 are disposed on both the left and right sides, in the direction of vehicle width, of the foot space of the front seat 7. Note that 36 is a side cover that is disposed to the side of the front seat 7. Rear doors 35 are disposed on both the left and right sides, in the direction of vehicle width, of the foot space of the rear seat 8.

The front frame space B in front of the front panel 5 is covered with a front hood 33 that is made from resin. This front hood 33 has left and right front fender portions 33a that cover the left and right front wheels 3 from above, and a lid portion 33b that opens and closes the front frame space B and is disposed between the front fenders portions 33a.

The lid portion 33b can rotate upwards about a hinge portion 33c provided at the front end thereof In addition, latching pieces 33d are formed at approximately the center in the front/rear direction of the vehicle of the left and right edge portions of the lid portion 33b. The latching pieces 33d irreversibly latch onto the latching portions 33e formed at approximately the center in the front/rear direction of the inner edge portions of the left and right front fender portions 33a, 33a. Furthermore, locking members 33f are formed so that they protrude downwards on the left and right outside end portions and on the rear end portions of the lid 33b. The locking members 33f lock and unlock with the locking holes 33g formed on the side of the front fender portion.

The lid portion 33b is fixed by the latching pieces 33d and locking members 33f, and, because the lid portion 33b is formed from light resin, rattling of the lid portion 33b due to travel vibrations or the like is prevented.

The steering wheel 30 is fixed on the upper end of the steering shaft 37. The steering shaft 37 is rotatably supported on a tube member 37a, and this tube member 37a is supported by a column support portion 5c provided on the upper portion of the front panel 5. The front panel 5 has a foot space 5b situated to the front of the lower side portion 16a of the front roof support 16 and a column support portion 5c that extends upwards at an incline towards the rear from the foot space 5b.

The steering shaft 37 is connected to the gear box 39 via an upper universal joint 38a, a middle shaft 38 and a lower universal joint 38b. The left and right output shafts 39a of the gear box 39 are connected to left and right front wheels 3.

The steering wheel 30 and steering shaft 37 are disposed to one side, specifically, the left side, of the center line E, in the direction of vehicle width. On the other hand, the gear box 39 is disposed generally in the center portion. The middle shaft 38 is thus disposed so that it angles downwards and inwards to the front from the left side, in the direction of the vehicle width, towards the approximate center, in the direction of the vehicle width.

The electric power steering unit 40 is mounted on the lower portion, in the axial direction, of the steering shaft 37. The electric power steering unit 40 is disposed below the lid portion 33b of the front hood 33.

The electric power steering unit 40 has an electric motor 40a and a gear mechanism 40b that transmits rotation of the electric motor 40a to the steering shaft 37 while decelerating. The electric motor 40a is disposed in the lower portion of the steering shaft 37 with the output shaft 40c facing in the direction of the vehicle width, fixed to the gear case 40f of the gear mechanism 40b.

Within the gear mechanism 40b, the drive gear 40d is fixed to the output shaft 40c of the electric motor 40a and meshes with the forward gear 40e fixed to the steering shaft 37.

A housing box 43 that houses the electrical components and the like is disposed under the front hood 33 on the other side of the center line E, specifically, the right side. This housing box 43 has a box-shaped bottom portion 43a that extends to the front/rear direction, and a lid portion 43b that opens and closes the top opening of the bottom portion 43a. An opening 43c for introducing external air is provided in the front end portion of the housing box 43. The housing box 43 is attached to the side frame 12f and the front cross pipe 12d, and the cross frame 12g. As a result, the housing box is generally disposed to the inside of the front wheels 3 in the direction of vehicle width, and is generally disposed above the top 3a of the front wheels 3 when in a stationary state.

A battery 49 is disposed in the rear portion of the housing box 43 and is fixed with a fixing band 51. In addition, an electric power steering control device 50 that controls the drive power in the electric power steering unit 40 is disposed in the front portion of the housing box 43. The battery 49 is connected via a power supply line to the power steering control device 50 and the electric motor 40a. The battery 49 is disposed at a location that is as high as possible in the front frame space B so that it is situated above the upper end 3a with the front wheels 3 in a stationary state. The electric power steering unit 40 is disposed so that the electric motor 40a at least partially overlaps with at least part of the battery 49 in the vertical direction of the vehicle. In other words, the electric power steering unit 40 is disposed so that at least portions of the electric motor 40a and battery are at the same height.

Moreover, the battery 49 is disposed to the right on the other side of the center line E in the direction of vehicle width, and the electric power steering unit 40 is disposed to the left on the other side of the center line E, thereby preventing the two from interfering.

The battery 49 and the electric power steering unit 40 are preferably disposed so that at least a portion thereof is positioned above the upper end 3a' of the front wheels 3 at their maximum upward stroke.

The battery 49 and the electric power steering unit 40 are provided behind, in the front/rear direction of the vehicle, the rear end 3b of the front wheels 3 and in front of the column support portion 5c of the front panel 5, preventing them from interfering with the vertical stroke of the front wheels 3. More preferably, at least a portion of the electric power steering unit 40 and the battery 49 is disposed above the upper end 3a' of the front wheels 3 at their maximum upward stroke, and thus the vertical stroke is more reliably ensured. The electric power steering unit 40 is generally disposed to the inside of the front wheels 3 in the direction of vehicle width, and is generally disposed above the top 3a of the front wheels 3 when in a stationary state.

Furthermore, the engine unit 6 is provided with a cooling device for cooling the engine coolant water to a suitable temperature. This cooling device is configured so that coolant water flows smoothly between the engine unit 6 and the radiator (heat exchanger) 41 disposed towards the front of the vehicle.

The radiator 41 of the cooling device is disposed in the center portion in the direction of vehicle width so that it is positioned above the center line E in the direction of vehicle width under the front hood 33. More specifically, the left and right outer ends 41a, in the direction of vehicle width, of the radiator 41 are disposed to the inside, in the direction of vehicle width, relative to the inner ends 40f, in the direction of vehicle width, of the electric power steering unit 40 and the inner end 49a, in the direction of vehicle width, of the battery 49.

In addition, the upper end 41b, in the vertical direction of the vehicle, of the radiator 41 is disposed above the lower end 40g, in the vertical direction of the vehicle, of the electric power steering unit 40 and the lower end 49b, in the vertical direction of the vehicle, of the battery 49. This radiator 41 is disposed inclined towards the rear, and interference with the front hood 33 is thus prevented, while increasing the capacity thereof.

The lid portion 33a of the front hood 33 is formed so that it can open and close the front frame space B. When the lid portion 33a is open, at least part of the electric power steering unit 40 and at least part of the battery 49 can be viewed from above.

An air cleaner 42 is disposed on the inside, in the direction of vehicle width, of the housing box 43 to the rear, in the front/rear direction of the vehicle, of the radiator 41 under the front hood 33. Note that 42c denotes the air intake of the air cleaner 42. In addition, 52 is a duct whereby cooling air is introduced into the transmission case 6j and is connected to the housing box 43. For this reason, external air is drawn into the housing box 43 from the opening 43c, cools the parts inside the housing box 43 and is introduced into the transmission case 6j.

The air cleaner 42 is disposed so that the left and right outer ends 42a are positioned inside, in the direction of vehicle width, of the inner end 40f, in the direction of vehicle width, of the electric power steering unit 40 and the inner end 49a of the battery 49. In other words, the air cleaner 42 is positioned between the battery 49 and the electric power steering unit 40.

The air cleaner 42 is also disposed so that the upper end 42b in the vertical direction of the vehicle is positioned above the lower end 40g of the electric power steering unit 40 and the lower end 49b of the battery 49.

A brake pedal 60 is provided under the steering wheel 30. This brake pedal 60 extends inside of the front frame space B, passing through the front panel 5, and a boss portion 60a thereof is supported so that it can pivot upwards and downwards from a support shaft 61a provided on a bracket 61. The bracket 61 is fixed so that it is suspended across the vertical pipe 61b that connects the left upper frame 12c and the left main pipe 12a of the front frame 12, and the corner pipe 61c that slants and connects the upper frame 12c and the vertical pipe 61b.

Thus, a drive arm 60b is formed on the brake pedal 60 so that it extends upwards from the boss portion 60a. A piston rod 62a of the master cylinder 62 is linked with this drive arm 60b. The master cylinder 62 is disposed in a state whereby it is inclined upwards and to the rear above the support shaft 61a of the brake pedal 60. The piston rod 62a of the master cylinder 62 is inserted via the drive arm 60b towards the rear of the vehicle. The oil pressure generated by the master cylinder 62 is supplied to the brake calipers 64 of the front wheels 3 and the brake calipers of the rear wheels 4. Note that 60c denotes a brake switch that turns on when the brake pedal 60 is depressed.

The master cylinder 62 is disposed near the front of the electric power steering unit 40. Specifically, the reserve tank 62b of the master cylinder is at least partially vertically aligned with the electric motor 40a when viewed from the front of the vehicle, and the rear end part of the master cylinder 62, as viewed from the front of the vehicle, is disposed so that it is at least partially vertically aligned with the upper universal joint 38a. In addition, the reserve tank 62b is disposed in the section bounded by the frame members 12d, 12c, 12g, 12f, and furthermore, the reserve tank 41c of the radiator 41 is disposed to the front of the reserve tank 62. The reserve tanks 62, 41c are exposed upwards when the front hood 33a is open.

The master cylinder 62 is disposed in a position that is higher than the support shaft 61a of the brake pedal 60, so that water spray or the like from the front wheels 3 cannot readily reach it. In addition, the reserve tank 41c of the radiator 41 and the reserve tank 62b of the master cylinder 62 are disposed so that they are exposed upwards when the front hood 33a is open, so that the brake fluid and coolant water can be readily checked.

In accordance with the all-terrain vehicle 1 of the present embodiment, the battery 49 is disposed above the top 3a of the front wheels 3 in a stationary state, and the electric motor 40a of the electric power steering unit 40 is disposed so that it at least partially overlaps with the battery 49 in the vertical direction. The electric motor 40a will thus not interfere with maintaining the vertical stroke of the front wheels 3. In addition, it is not necessary to dispose the front wheels 3 outwards in the direction of vehicle width in order to maintain the vertical stroke of the front wheels 3, the electric power steering unit 40 can be mounted while maintaining a compact vehicle width, and a long vertical stroke can be maintained for the front wheels 3.

Furthermore, the radiator 41 of the cooling device is disposed on the center line E, in the direction of vehicle width, below the front hood 33. More specifically, the left and right outer ends 41a, in the direction of vehicle width, of the radiator 41 are disposed inside, in the direction of vehicle width, of the inner ends 49a, 40f, in the direction of vehicle width, of the battery 49 and the electric power steering unit 40, so that the radiator 41 and the battery 49 will not interfere with the electric power steering unit 40.

The upper end 41b, in the vertical direction of the vehicle, of the radiator 41 is positioned above the lower ends 49b, 40g, in the vertical direction of the vehicle, of the battery 49 and the electric power steering unit 40, and thus the radiator 41 is disposed between the battery and the electric power steering unit. By also extending the radiator 41 in the vertical direction, the radiator 41 can be disposed in a more compact condition in the vertical direction while increasing the heat dissipation capacity. In this case, the radiator 41 is disposed at a rearward incline, thereby decreasing any increase in height of the front hood 33.

An air cleaner 42 is disposed on the inside, in the direction of vehicle width, of the housing box 43 to the rear, in the front/rear direction of the vehicle, of the radiator 41 under the front hood 33. In addition, 52 is a duct whereby cooling air is introduced into the transmission case 6j and is connected to the housing box 43. For this reason, external air is drawn into the housing box 43 from the opening 43c, cools the parts inside the housing box 43 and is introduced into the transmission case 6j.

The air cleaner 42 is disposed so that the left and right outer ends 42a are positioned inside, in the direction of vehicle width, of the inner end 40f, in the direction of vehicle width, of the electric power steering unit 40 and the inner end 49a of the battery 49. In other words, the air cleaner 42 is positioned between the battery 49 and the electric power steering unit 40.

The air cleaner 42 is also disposed so that the upper end 42b in the vertical direction of the vehicle is positioned above the lower end 40g of the electric power steering unit 40 and the lower end 49b of the battery 49.

The upper end 42b of the air cleaner 42, in the vertical direction of the vehicle, is positioned higher than the lower ends 49b, 40g, in the vertical direction of the vehicle, of the battery 49 and the electric power steering unit 40, thereby allowing the air cleaner capacity to be maintained.

An opening 43c is provided in the front end of the housing box 43, and a duct 52 is connected that introduces cooling air into the transmission case 6j in the back part of the housing box 43. Thus, air is drawn into the housing box 43 from the opening 43c and can cool the battery 49 and the electrical power steering control device 50 inside the housing box 43.

When the lid 33b of the front hood 33 is open, at least part of the electric power steering unit 40 and the housing box 43 that houses the battery 49 can be viewed from above, thereby facilitating checking equipment installation for the battery 49, electric motor 40a or the like.

The front hood 33 is constituted by the front fender portion 33a and the lid portion 33b, allowing only the lid portion 33b to be opened and closed, thereby preventing more members than necessary from being opened and closed and allowing the rigidity of the lid portion 33b itself to be maintained. In addition, the lid portion 33b is comparatively small, and thus the anchoring strength can be increased when the lid portion 33b is closed. Moreover, the center portion of the lid portion 33b, along its longitudinal direction, latches with a latching portion 33e via a latching piece 33d, and the rear end portion is locked in the locking hole 33g via a locking member 33f, allowing the lid portion 33b to be even more reliably anchored.

In the above embodiment, a vehicle was described in which the battery 49 is disposed inside the housing box 43, but the battery 49 may also be mounted on the vehicle frame without being housed in the housing box. In such a case, the battery 49 can be directly viewed by opening the lid portion 33b of the front hood 33, allowing more rapid checking of equipment.

In the above embodiment, a vehicle was also described in which front seats and rear seats are provided, but the present invention can also be utilized with vehicles in which only front seats are provided.

In the above embodiment, a four-wheeled vehicle was described in which a pair of left and right front wheels and a pair of left and right rear wheels are provided, but the present invention is not restricted to vehicles having this number of wheels. For example, the present invention may also be utilized with six-wheeled vehicles in which two pairs of left and right rear wheels are provided.

Furthermore, the above embodiment described a vehicle in which front roof supports, center roof supports, and rear roof supports were provided, but the present invention may be utilized with vehicles in which no center roof supports are provided.

The invention claimed is:

1. A vehicle comprising:
   a vehicle body frame;
   a first roof support including a pair of left and right pipe members extending vertically from left and right sides of the vehicle body frame;
   a pair of left and right second roof supports including pipe members extending vertically from the left and right sides of the vehicle body frame to a rear of the first roof support;
   a roof member connected to an upper portion of the first roof support and an upper portion of the pair of left and right second roof supports;
   a pair of left and right front wheels supported on the vehicle body frame;
   at least one pair of left and right rear wheels supported on the vehicle body frame;
   a front panel provided to a rear of the pair of left and right front wheels;
   a seat provided to a rear of the front panel;
   an engine and a transmission provided to the rear of the front panel;
   a front hood arranged in front of the front panel and to cover a portion of the vehicle from above;

a battery provided below the front hood, where at least an upper portion of the battery is positioned above a top of the pair of left and right front wheels when the vehicle is in a stationary state;

an electric power steering unit provided under the front hood and including an electric motor disposed so that at least a section of the electric motor vertically overlaps at least a section of the battery; and an electric power steering control device connected to the battery and the electric motor.

2. A vehicle according to claim 1, wherein:

the battery and the electric power steering unit are disposed on opposite sides of the vehicle in a width direction of the vehicle.

3. A vehicle according to claim 2, further comprising:

a cooling device arranged to cool the engine, where a heat exchanger of the cooling device is disposed under the front hood so that at least a section of the heat exchanger is positioned on a center line in the width direction of the vehicle.

4. A vehicle according to claim 3, wherein:

left and right outer ends of the heat exchanger are positioned inside left and right inner ends of the battery and the electric power steering unit.

5. A vehicle according to claim 4, wherein:

a top of the heat exchanger is positioned above a bottom of the battery and the electric power steering unit.

6. A vehicle according to claim 3, further comprising:

an air cleaner disposed below the front hood and behind the heat exchanger.

7. A vehicle according to claim 6, wherein:

left and right outer ends of the air cleaner are positioned inside left and right inner ends of the battery and the electric power steering unit.

8. A vehicle according to claim 7, wherein:

a top of the air cleaner is positioned above a bottom of the battery and the electric power steering unit.

9. A vehicle according to claim 1, wherein:

the battery and the electric power steering unit are disposed behind the pair of left and right front wheels and in front of the front panel.

10. A vehicle according to claim 1, wherein:

at least a portion of the battery and a portion of the electric power steering unit are positioned above the top of the pair of left and right front wheels at a maximum upward stroke of the pair of left and right front wheels.

11. A vehicle according to claim 1, wherein:

the front hood is arranged to open and close, and, when the front hood is open, at least a portion of the battery and at least a portion of the electric power steering unit can be viewed from above.

12. A vehicle according to claim 1, wherein:

a portion of the front hood can be opened and closed.

13. A vehicle comprising:

a vehicle body frame;

a pair of left and right front wheels supported on the vehicle body frame;

a first roof support structure including a left roof support structure and a right roof support structure extending vertically from left and right sides of the vehicle body frame;

a first front frame cross member interconnecting said left and right roof support structures;

a first and a second outer front frame member extending from said first front frame cross member toward a front of said vehicle body frame;

a second front frame cross member, generally parallel to said first front frame cross member, disposed at distal ends of said first and second outer front frame members, wherein said first and second front frame cross members in conjunction with said first and second outer front frame members define a front frame space;

left and right interior front frame members, disposed inward toward a center of the vehicle body frame, interconnecting said first and second front frame cross members;

a battery housing, arranged to house a battery, located inside said front frame space, arranged on either of said first or second outer front frame members, and located generally at a height greater than a height of said pair of left and right front wheels;

a front panel provided to a rear of the pair of left and right front wheels;

a steering shaft rotatably supported by the front panel; and a power steering unit mounted on a lower portion of the steering shaft;

wherein the power steering unit includes an electric motor disposed so that at least a section of the electric motor has a common horizontal plane with a section of the battery; and the battery and the electric power steering unit are disposed in front of the front Panel.

14. A vehicle according to claim 13, further comprising:

a power steering control device disposed inside the front frame space so that at least a section of the power steering control device has a common horizontal plane with a section of the battery.

15. A vehicle according to claim 14, wherein:

said power steering control device is disposed inside the battery housing.

16. A vehicle according to claim 15, wherein:

said pair of left and right front wheels have a maximum rearward and upward displacement from a stationary position of said pair of left and right front wheels; and said battery housing and said power steering unit are mounted at a location above and rearward of said maximum rearward and upward displacement of said pair of left and right front wheels.

* * * * *